March 19, 1963 K. PERKINS 3,081,713
CAM TYPE SPACING FEEDER
Filed May 29, 1961 4 Sheets-Sheet 1
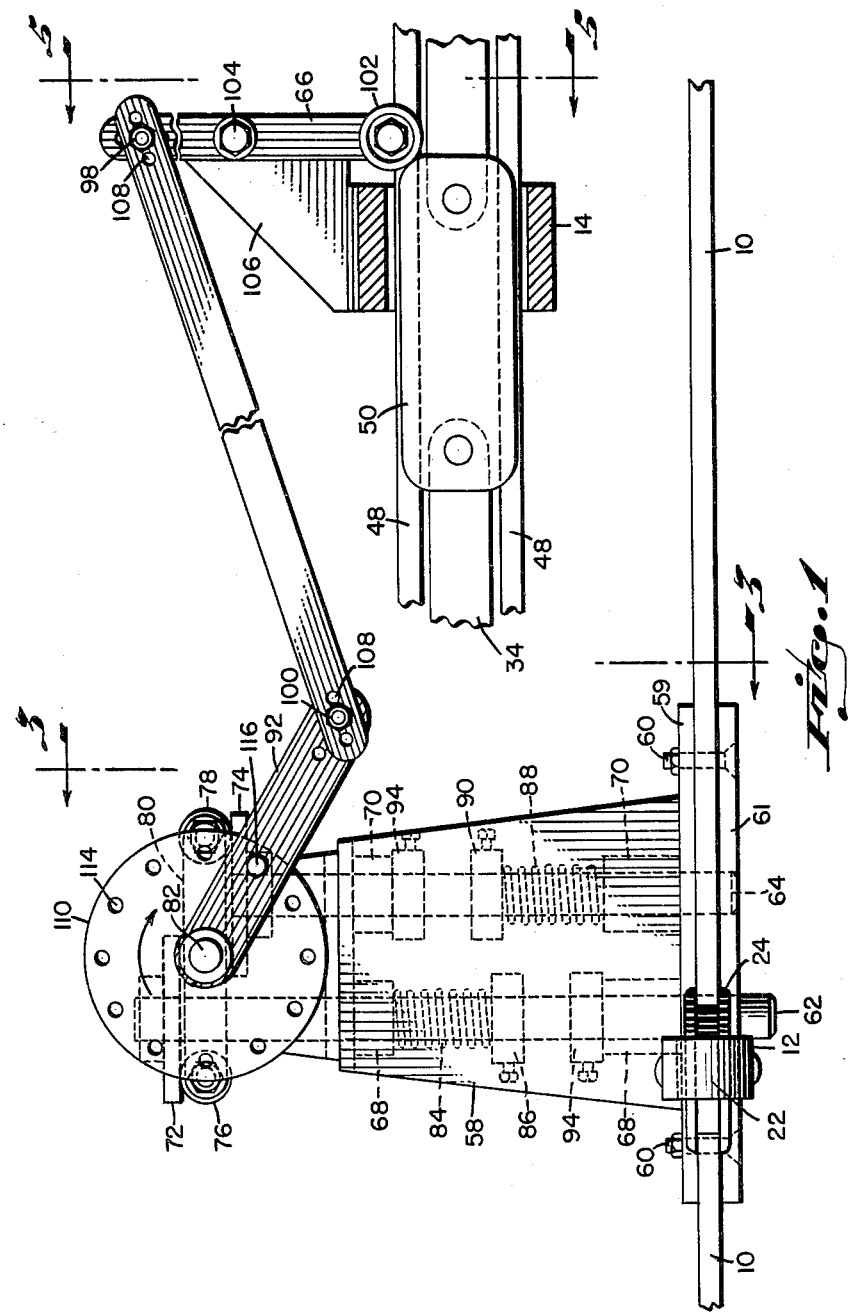
INVENTOR.
KENNETH PERKINS
BY
ATTORNEY

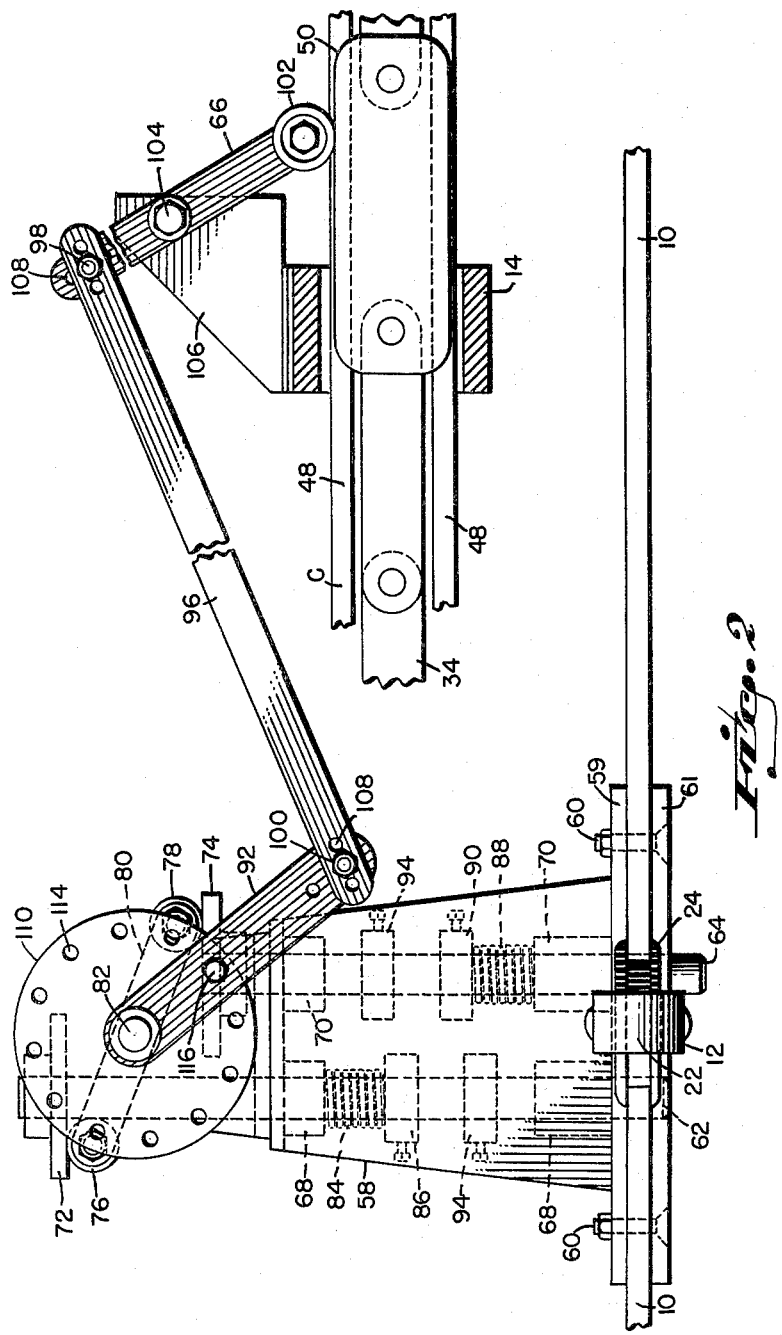

March 19, 1963 K. PERKINS 3,081,713
CAM TYPE SPACING FEEDER
Filed May 29, 1961 4 Sheets-Sheet 3
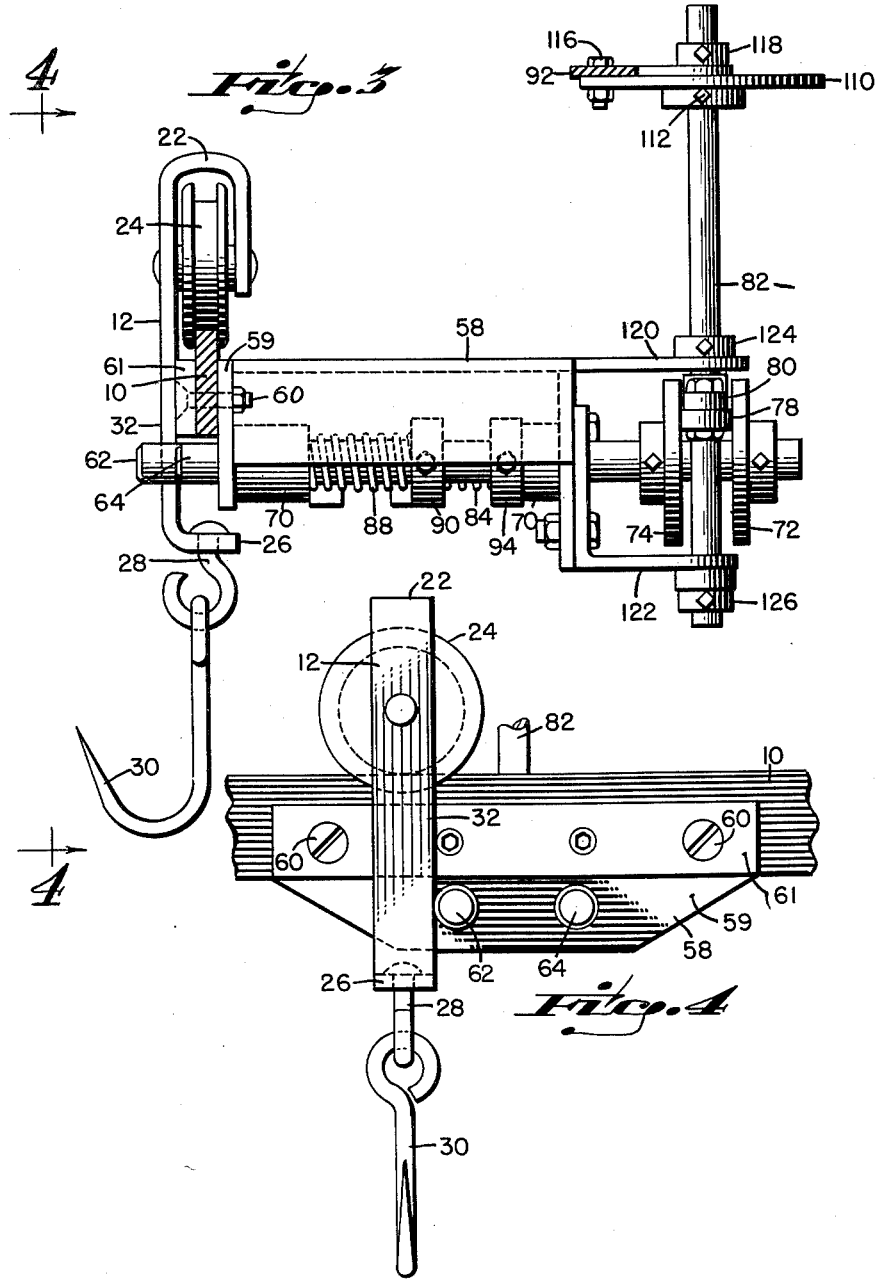
INVENTOR.
KENNETH PERKINS
BY
J. Warren Kinney Jr.
ATTORNEY

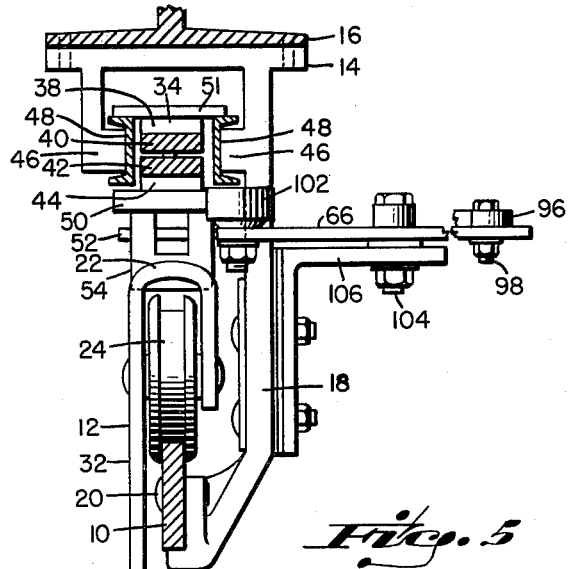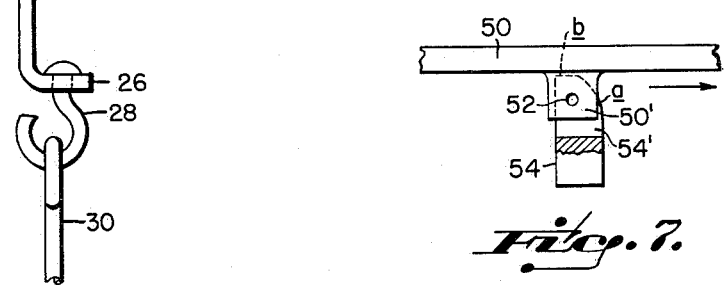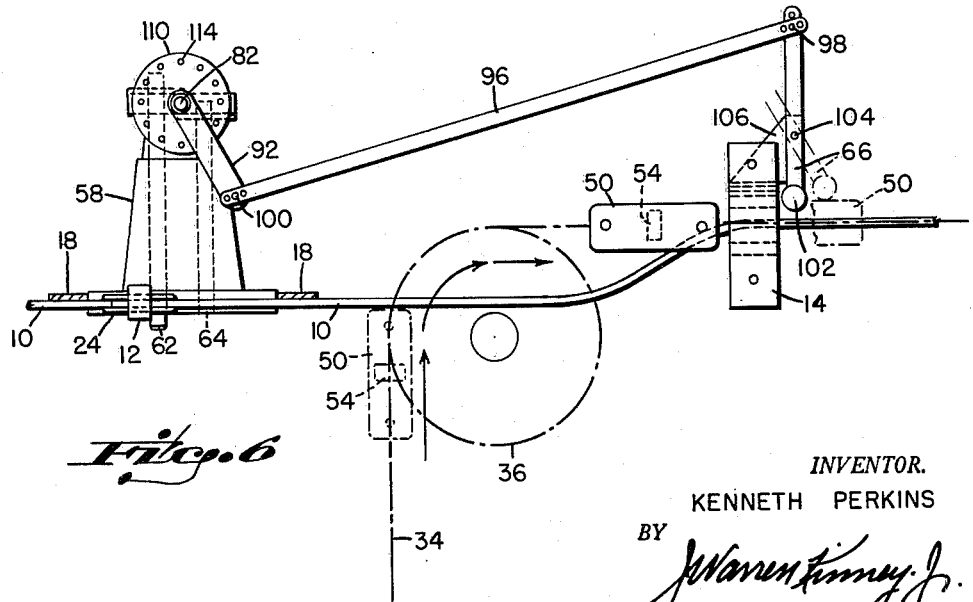

3,081,713
CAM TYPE SPACING FEEDER
Kenneth Perkins, Cincinnati, Ohio, assignor to The Cincinnati Butchers' Supply Company, Cincinnati, Ohio, a corporation of Ohio
Filed May 29, 1961, Ser. No. 113,532
20 Claims. (Cl. 104—250)

The present invention relates to a spacing feeder for overhead conveyor. The device of the invention, while suited for other uses, has been employed for feeding to a continuously moving conveyor, in spaced succession, meat hooks carrying carcasses of animals in the process of dressing and other treatment in the production of meat for food.

In at least one phase of the meat packing procedure, the carcasses of meat animals are hung from elevated hooks which receive their support from an overhead rail which serves as a conveyor, each hook being suspended from a roller frame, and a succession of roller frames being carried by the overhead rail for free movement from one dressing operation or station to another.

For conserving space and providing otherwise for economical and convenient handling, the roller frames with the carcasses hanging therefrom, are permitted to accumulate along the overhead rail with the carcasses lined up in contacting succession. This crowded condition of carcasses creates a situation which, in certain phases of meat processing, interferes with convenient and expeditious further handling and treatment.

One object of the present invention is to provide durable and dependable automatic means for feeding accumulated roller frames and their suspended carcasses or loads, from one section of a conveyor rail to another section, with the assurance that the roller frames and their loads will be advanced in a properly spaced condition.

Another object is to provide a spacing feeder of the type mentioned, which is simple and inexpensive of construction, and readily applicable to existing conveyor systems presently in use at major meat packing plants.

A further object of the invention is to conserve valuable space in a packing plant, and to facilitate and expedite the meat processing procedure, with substantial savings of time and labor.

The foregoing and other objects are attained by the means described herein and illustrated upon the accompanying drawings, in which:

FIG. 1 is a top plan view of the spacing feeder apparatus of the present invention, as applied to a section of a conveyor system, the apparatus being shown holding a roller frame prior to a spacing operation.

FIG. 2 is a view similar to FIG. 1, showing the roller frame in readiness for a releasing operation preparatory to spacing it from other roller frames.

FIG. 3 is a cross-sectional view taken on line 3—3 of FIG. 1.

FIG. 4 is a fragmental elevational view looking from left to right upon FIG. 3.

FIG. 5 is a cross-sectional view taken on line 5—5 of FIG. 1.

FIG. 6 is a top plan view on a reduced scale, showing application of the invention to a typical rail or conveyor system, parts thereof being shown diagrammatically.

FIG. 7 is a detail view showing a portion of a trip plate and the pivot mounting thereon of the depending finger or pusher element carried by the plate.

In the drawings, 10 indicates an overhead rail of indeterminate length passing through the packing plant, and which supports a number of individual roller frames 12 to ride upon the rail. The rail may be suspended substantially horizontally, though slightly pitched at certain locations, the suspension being from suitable hangers 14 (FIG. 5) applied to I-beams 16 forming part of the plant superstructure. Each hanger may include a depending hanger arm 18 to which the rail 10 is fixed, as at 20. As will be understood, a number of hangers are located throughout the plant to direct the rail 10 from one processing station to another, and not necessarily in a straight line.

Each roller frame 12 may comprise a heavy metal strap as shown, bent upon itself at 22 to provide a bifurcated head within which is rotatably supported a flanged roller 24 that rides upon rail 10. At the lower or foot end of the roller frame, a portion may be bent transversely as at 26, and perforated to support a swivel member 28 from which the meat hook 30 depends. The body portion 32 of the roller frame hangs in substantial parallelism with rail 10, and is laterally spaced therefrom. Along certain portions of the length of rail 10, the roller frames may travel freely by gravity, whereas along other portions the roller frames are individually propelled in spaced relationship, as will be explained.

Whenever the roller frames are to be propelled in spaced relationship during advancement thereof along rail 10, a conveyor chain may be employed running in parallelism with and above the rail 10. Thus, as in FIGS. 5 and 6, the character 34 indicates generally a conveyor chain which may be trained about a sprocket 36 to change direction, and to move in parallelism with rail 10. As FIG. 5 clearly shows, the links 38, 40, 42 and 44 of the chain 34 are disposed in a horizontal plane, and move between the arms 46 of hanger 14. Said arms may carry fixed chain guides 48 in the form of channel members as shown.

Some of the uppermost links 38 of chain 34 carry or comprise a wide skid plate 51 whose outer sides rides upon the upper surfaces of guides 48, to preclude sagging of the chain. Likewise, some of the lowermost links 44 of the chain carry or comprise wide trip plates 50 which extend laterally beyond the links, for a purpose to be explained.

Each trip plate 50 carries a pivot 52 upon which is swingingly suspended a depending finger 54, for engaging the head 22 of a roller frame.

By this means the roller frame may be positively propelled, driven or advanced along rail 10 by the finger or pusher element 54 at the speed of travel of chain 34. From the vertical position of suspension, finger or pusher element 54 swings in one direction only about its pivot 52, so that it will always positively engage and propel a roller frame which is ahead of it, but will permit a following roller frame to pass thereunder in the event that it is necessary or desirable to advance a roller frame along the rail at a rate greater than the rate of travel of chain 34.

While any suitable pivotal connection may be provided between the finger or pusher 54 and the trip plate 50, whereby the finger or pusher element 54 may swing in one direction only, FIG. 7 illustrates one such means for mounting the pusher element. In this figure the middle portion only of a trip member 50 is shown. The trip member is illustrated as having a depending tongue portion 50' and the pusher element 54 is illustrated as being bifurcated. One of the furcations is shown broken away to more clearly illustrate the positioning of the depending tongue 50' in the space between the furcations.

The forward or advancing side of each of the furcations is curved upwardly and rearwardly as indicated at $a$ to a short flat top portion $b$ which contacts the underside of the trip member or plate 50 and holds the pusher element against rearward swinging movement. The curved forwardly facing surfaces $a$ of the furcations, however, will permit the pusher element to swing forwardly on pivot 52 as will be readily apparent.

Referring now to FIG. 6, it may be noted that the roller frame 12 upon rail 10 is intercepted by a plunger, 62 or 64, extending across the rail, so that frame 12 cannot advance along the rail to the right even though the rail is slightly inclined downwardly in that direction. In this drawing view, it should be understood that, except for an intercepting plunger, roller frame 12 could gravitate freely to the right, as sprocket 36, chain 34, and pushers 50 are at a higher elevation than rail 10 (see FIG. 5) which would permit the roller frame to swing the pusher element out of the way and pass thereunder.

The plungers aforesaid are part of a spacing feeder indicated generally by the character 58. The housing of the feeder extends horizontally from rail 10, and may be secured to one side of the rail by means of screws or other fasteners 60, as shown, passing through the housing base 59, rail 10, and a spacer plate 61.

The housing of spacing feeder 58 carries the pair of reciprocable plungers 62 and 64, and includes means for alternately projecting them across the rail to intercept successive gravity-fed roller frames 12. When plunger 62 is advanced (FIG. 6), it stops roller frame 12 and any others that tend to follow it along the rail. Upon retraction of plunger 62, the other plunger 64 will advance, and in the interim the roller frame 12 will advance by gravitation against the second plunger, there to remain until released by the second plunger 64 when retracted. So it will be understood that each cycle of plunger actuation effects release of a roller frame 12 onto the downwardly pitched section of rail 10 which is to the right of the spacing feeder, in FIG. 6. It should be understood that all roller frames on rail 10 to the left of feeder 58, approach the feeder by gravitation along the rail. Also, in any given installation, the elevation of rail 10 at the spacing feeder 58 is higher than at the trip lever 66 which controls operation of the feeder.

Plungers 62 and 64 are supported in spaced parallelism within the feeder housing, by means of bushings 68—68 and 70—70 within which the plungers may reciprocate. At the rear ends of the plungers are fixed the cam plates 72 and 74, which may be in the form of discs as shown, adapted to be driven bodily in opposite directions by means of cam rollers 76 and 78 carried at opposite ends of a rocker arm 80, which rocker arm is in turn fixed midway between its ends to a camshaft 82.

A compression spring 84 mounted upon plunger 62 between a bushing 68 and an adjustable collar 86, serves to constantly urge the plunger to extended position across rail 10, while at the same time yieldingly urging the cam plate 72 against cam roller 76. Likewise, a compression spring 88 on plunger 64 acts against a fixed collar 90 to yieldingly maintain cam plate 74 in contact with cam roller 78. Thus it will be apparent that rocking movement of camshaft 82 by means of the camshaft lever 92 normally fixed relative thereto, will serve to alternately extend and retract the free outer ends of plungers 62 and 64 transversely of rail 10. The adjustable collars shown at 94 serve as stops to limit the extent of projection and retraction of the plungers.

Camshaft 82 may be subjected to rocking movement incident to passage of the trip plates 50 successively past the trip lever 66, as conveyor chain 34 advances in the direction of the arrow in FIG. 6. Trip lever 66 is to be located remotely downstream from the spacer feeder, and may have mechanical connection therewith by way of a connecting bar 96 pivoted at 98 and 100 upon the trip lever and the camshaft lever, respectively. The trip lever may carry a roller 102 to be struck by the trip plates 50, and will preferably be pivoted intermediate its ends, as at 104, upon a fixed bracket 106 applied to hanger arm 18, or elsewhere on the conveyor chain system.

For purposes of adjustment and timing, the pivots 98 and 100 may be shifted to various positions upon levers 66 and 92, and upon connecting bar 96, by providing these parts with clusters of holes 108 through which the pivots may be extended, as shown. Further adjustments may be achieved by applying to camshaft 82 an adjustment disc 110 locked upon the camshaft by set screw 112, and provided with a series of marginal holes 114 any one of which may accommodate a locking bolt 116 passing through camshaft lever 92. By means of these adjustments, the assembly may be accommodated to various straight and curved rail sections as found in various typical conveyor system layouts.

The collar 118 shown in FIG. 3 serves to hold lever 92 against disc 110 in the region of camshaft 82, and provides for detachment of lever 92 when necessary. The camshaft may be journaled for rotation by passing it through the perforated extensions 120 and 122 of the spacing feeder housing, and suitable collars 124—126 may be applied to the camshaft for maintaining it in proper relationship to the cam plates 72 and 74.

The operation of the apparatus is as follows: Referring to FIG. 6, it must be understood that rail 10 is slightly pitched downwardly, from left to right, and that the rail to the left of feeder 58 carries a number of roller frames 12 each suspending an animal carcass. Said roller frames with their carcasses gravitate from the left toward plunger 62, which arrests their advancement en masse, the carcasses being in contact one with another all along the rail to the left of feeder 58.

With the sprocket 36 and chain conveyor 34 placed in motion, one of the trip plates 50 will strike and move trip lever 66 to the dotted line position of FIG. 6, causing the connecting bar 96 to actuate camshaft 82 for retracting plunger 62 and simultaneously projecting the second plunger 64 into the path of advancement of the first roller frame 12. By the time said roller frame gravitates along rail 10 to strike the second plunger 64, the trip plate 50 will have passed the trip lever 66, thereby to permit the trip lever to return to the normal vertical position shown in full lines, this movement of the trip lever being assisted by the force of plunger springs 84 and 88. Plunger 64 now is in retracted position, and has released the roller frame previously held thereby. At the same time, the first plunger 62 has moved into intercepting relationship to the next roller frame, whereby it will be held until another trip plate 50 strikes and moves the trip lever 66.

When as before stated, the second plunger 64 released a roller frame and its suspended carcass, the roller frame so released proceeded to advance to the right on rail 10, where and along which it will be advanced by contact with depending finger 54 of a trip plate which will propel the roller frame along rail 10 at a rate established by the speed of chain 34 which carries the trip plates 50.

From the foregoing, it will be understood that each and every roller frame released by plunger 64 will find itself propelled in travel by a depending finger of a trip plate, which the result that all roller frames and their suspended carcasses will, upon passing the trip lever 66, be spaced apart a distance equal to the spacing between successive trip plates 50. In the spaced condition, the successive roller frames and carcasses will eventually reach a processing station, where with great convenience and regularity, an operation may be performed upon the carcasses.

The nature of the present apparatus is such as to lend itself to application in many different conveyor arrangements, flexibility of installation being one of the important features of the device. There are no delicate parts to be serviced or replaced, and consequently, the apparatus is found to be highly reliable and trouble-free in its operation. Other features of merit and advantage have been noted hereinbefore, and still others will be manifest to persons conversant with the art.

It is to be understood that various modifications and changes may be made in the structural details of the apparatus, within the scope of the appended claims, without departing from the spirit of the invention.

What is claimed is:

1. Spacing feeder apparatus for overhead conveyors, comprising in combination, an overhead rail supported at an inclination, and a plurality of roller frames tractionally supported for advancement along the rail by gravitation, a feeder alongside the rail at one location and including at least two adjacent oppositely movable stop means to hold an accumulation of roller frames against descend along a portion of the rail, a moving conveyor having a reach in close parallelism with that portion of the rail from which the roller frames are withheld by the feeder, a succession of trip members spaced upon and movable with the conveyor, means in the path of movement of the trip members for initiating opposite releasing movement of the stop means of the feeder, to thereby release a single roller frame upon passage of each trip member past said release initiating means and simultaneously restrain movement of a following roller frame; and a succession of spaced pusher elements on the conveyor, disposed in the path of advancement of released roller frames gravitating along the rail, operative to effect movement of the roller frames along the rail at a rate of speed not in excess of the conveyor speed.

2. The apparatus as set forth in claim 1, wherein the aforesaid spaced pusher elements on the conveyor are carried one each by the several trip members.

3. Spacing feeder apparatus for overhead conveyors, comprising in combination, an overhead rail supported at an inclination, and a plurality of roller frames tractionally supported for advancement along the rail by gravitation, a feeder alongside the rail at one location and including at least two adjacent oppositely movable releasable stop means to normally hold an accumulation of roller frames against descent along a portion of the inclined rail, a moving conveyor having a reach in close parallelism with that portion of the rail from which the roller frames are withheld by the feeder stop means, a succession of trip members spaced upon and movable with the conveyor, means in the path of movement of the trip members, and located downstream of the feeder, for initiating a releasing operation of the feeder, to thereby release a single roller frame upon passage of each trip member past said release initiating means, and a succession of spaced pusher elements on the conveyor, disposed in the path of advancement of released roller frames gravitating along the rail, operative to advance said frames along the rail at a rate of speed equal to the conveyor speed, said pusher elements being hinged to swing in one direction only, for displacement by movement of a roller frame along said rail at a rate of travel in excess of the conveyor speed.

4. The apparatus as set forth in claim 3, wherein the aforesaid spaced pusher elements are hinged one each upon a trip member.

5. Spacing feeder apparatus for overhead conveyors, comprising in combination, an overhead rail supported at an inclination, and a plurality of roller frames tractionally supported for advancement along the rail by gravitation, a feeder alongside the rail at one location including a reciprocable releasable stop means to normally hold an accumulation of roller frames against descent along a portion of the inclined rail and supported for rectilinear movement across the rail, a moving conveyor having a reach in close parallelism with that portion of the rail from which the roller frames are withheld by the said feeder stop means, a succession of trip members spaced upon and movable with the conveyor and trip means in the path of movement of the trip members for initiating a reciprocable releasing operation of the said feeder stop means, to thereby release a single roller frame upon passage of each trip member past said trip means.

6. The combination as set forth in claim 5, wherein is included adjustment means for timing the roller frame release with respect to the distance between the feeder stop means and any given trip member of the conveyor.

7. Spacer feeding apparatus for overhead conveyors, comprising in combination, an overhead rail supported at an inclination, and a plurality of roller frames tractionally supported for advancement along the rail by gravitation, a feeder alongside the rail at one location including a releasable stop means to normally hold an accumulation of roller frames against descend along a portion of the inclined rail, a moving conveyor having a reach in close parallelism with that portion of the rail from which the roller frames are withheld by the feeder stop means, a succession of trip members spaced upon and movable with the conveyor, trip means in the path of movement of the trip members, and located downstream of the feeder, for initiating a releasing operation of the feeder, thereby to release a single roller frame upon actuation of the trip means by each passing trip member, a pusher element carried by and extending from each trip member into the path of advancement of a roller frame released and gravitating along the rail, operative to abut the roller frame and coordinate its rate of advancement with the rate of advancement of the conveyor, and means for adjusting the extent of actuation of said trip means for timing the roller frame release with respect to the position of any given trip member pusher element along the rail at the time of release.

8. Spacer feeding apparatus for overhead conveyors, comprising in combination, an overhead rail supported at an inclination, and a plurality of roller frames each having a head, and each supported tractionally for advancement along the rail by gravitation, a feeder alongside the rail at one location including a releasable stop means to normally hold an accumulation of roller frames against descent along a portion of the inclined rail, a moving conveyor having a reach in close parallelism with that portion of the rail from which the roller frames are withheld by the feeder stop means, a succession of trip members spaced upon and movable with the conveyor, a trip lever in the path of movement of the trip member, and located downstream of the feeder, for initiating a releasing operation of the feeder upon each actuation of the trip lever by a moving trip member, a pivot element on each trip member, and a pusher element vertically suspended from the pivot element to swing in one direction only from the vertical position, said element when vertically suspended being in the path of movement of the roller frame head, and when swung from the vertically suspended position said element clears the roller frame head.

9. The apparatus as set forth in claim 8, wherein at the location of the trip lever the rail and the moving conveyor are disposed in a common vertical plane.

10. Apparatus for the control of a succession of roller frames adapted to gravitate along an inclined rail, said apparatus comprising an elongate housing secured to the rail and extending laterally therefrom, a pair of elongate plungers each reciprocable within a guide aperture of the housing across said rail to and from a position of roller frame interception, and movable trip means operatively coupled with said plungers to extend and retract said plungers in alternation for successive release of the roller frames for gravity advancement along the rail.

11. The device as set forth in claim 10, wherein the space between the plungers in the vicinity of the rail is sufficiently extensive to accommodate but one roller frame therebetween.

12. Apparatus for the control of a succession of roller frames adapted to gravitate along an inclined rail, said apparatus comprising a housing fixed to the rail and extending laterally therefrom, a pair of elongate plungers each having a free end projecting through an aperture of the housing and reciprocable transversely across the rail to provide a barrier precluding movement of the roller frames down the inclined rail, a cam plate fixed upon the opposite end of each plunger, and bearing means on the housing supporting the plungers for reciprocation in spaced substantial parallelism, a rockable camshaft and means supporting the camshaft for rocking movement between the cam plates of the plungers, a rocker arm on the camshaft spanning both cam plates, said rocker arm having opposite ends each contacting one of the cam plates, means for rotating the camshaft to advance the rocker arm ends against the cam plates for shifting said plates and their associated plungers in opposite directions axially, thereby to project the free end of one plunger while retracting the free end of the other plunger relative to the inclined rail, and yielding means for returning the plungers to original position.

13. The apparatus as set forth in claim 12, wherein the space between the free ends of the plungers is limited to accommodate not more than one roller frame.

14. Apparatus for the control of a succession of roller frames adapted to gravitate along an inclined rail, said apparatus comprising an apertured housing attachable to the rail for extension laterally therefrom, a pair of elongate plungers each reciprocable within an aperture of the housing to and from a position of roller frame interception across the rail, camming means including a camshaft rockingly supported upon the housing, for projecting one plunger while retracting the other plunger, a camshaft lever having one end thereof pivoted upon the camshaft, an adjustment disc having a hub fixed upon the camshaft adjacent to the camshaft lever, and means detachably anchoring the camshaft lever at selected locations upon the peripheral margin of the adjustment disc.

15. The apparatus as set forth in claim 14, wherein the combination includes means for yieldingly projecting one of the plungers while retracting the other plunger, in opposition to the driving force of the camming means.

16. Apparatus for the control of a succession of roller frames adapted to gravitate along an inclined rail, said apparatus comprising a housing attachable to the rail for extension laterally therefrom, a pair of elongate plungers and means on the housing supporting the plungers for reciprocation to and from a position of roller frame interception transversely of the rail, camming means including a camshaft rockingly supported upon the housing, for projecting one plunger while retracting the other plunger, a camshaft lever including means for fixing said lever relative to the camshaft, whereby rocking of the camshaft lever actuates the camming means to reciprocate the plungers, means for yieldingly urging one of the plungers to projection while urging the other plunger to retraction, in opposition to the driving force of the camming means, and linkage including a trip lever remote from the housing but adjacent to the rail, for rocking the camshaft lever in one direction of rotation.

17. The apparatus as set forth in claim 16, wherein the combination includes means for selectively fixing the camshaft lever in various radial positions with respect to the camshaft axis.

18. In an overhead conveyor, the combination with an overhead rail and a plurality of body suspending members each of which includes a roller tractionally supported on the rail for advancement thereon by gravitation, a feeder for said members disposed at one side of the rail and embodying at least two elongate stop members supported in spaced, juxtaposed relation for rectilinear movement across the rail to hold an accumulated group of members, mechanism operatively coupled with said stop members for effecting, when actuated, the alternate advancement and retraction of the stop members across the rail whereby the accumulated suspension members are individually successively released for advancement first from the group to a position of confinement between the stop members and then from said confinement position for continued movement by gravitation on the track, a succession of trip members supported for movement in spaced relation with one another along a path adjacent to and paralleling the track, means for moving said trip members along said path, and means operatively connected to said mechanism and actuated by said trip members for actuating the mechanism.

19. The invention according to claim 18, with a pusher means carried by each trip member for engaging and pushing a body supporting member along a predetermined part of the rail following release of the body supporting member from the feeder.

20. The invention according to claim 19, wherein the said pusher means on each trip member is elongate and is pivotally suspended to swing only from a substantially vertical position in the direction of travel of the trip member whereby to permit passage past the trip member and pusher means by a body suspending member moving along the said rail at a rate of travel in excess of the speed of movement of the trip members.

References Cited in the file of this patent

UNITED STATES PATENTS

| | | |
|---|---|---|
| 618,396 | Cowles | Jan. 31, 1899 |
| 1,865,788 | Raymond | July 5, 1932 |
| 1,917,836 | Haddlesay | July 11, 1933 |
| 2,078,503 | Meiser | Apr. 27, 1937 |
| 2,318,180 | Morse | May 4, 1943 |
| 2,832,297 | Daniels | Apr. 29, 1958 |
| 2,868,138 | Bishop et al. | Jan. 13, 1959 |